United States Patent [19]
Kemp

[11] 3,865,737
[45] Feb. 11, 1975

[54] PROCESS FOR PREPARING HIGHLY-BASIC, MAGNESIUM-CONTAINING DISPERSION

[75] Inventor: Paul Clifford Kemp, Wilmington, Del.

[73] Assignee: Continental Oil Co., Ponca City, Okla.

[22] Filed: July 2, 1973

[21] Appl. No.: 374,210

Related U.S. Application Data

[63] Continuation-in-part of Ser. No. 245,635, April 19, 1972, abandoned.

[52] U.S. Cl. .................. 252/33.4, 252/18, 252/33, 252/39, 252/40.7
[51] Int. Cl. ............................................. C10m 1/40
[58] Field of Search ........ 252/18, 33, 33.4, 39, 40.7

[56] References Cited
UNITED STATES PATENTS

| | | | |
|---|---|---|---|
| 2,839,470 | 6/1958 | Warren et al. | 252/39 X |
| 3,126,340 | 3/1964 | Sabol et al. | 252/18 |
| 3,524,814 | 8/1970 | Sabol et al. | 252/33 X |
| 3,609,076 | 9/1971 | Sabol et al. | 252/18 X |
| 3,629,109 | 12/1971 | Gergel et al. | 252/39 X |

*Primary Examiner*—Delbert E. Gantz
*Assistant Examiner*—Andrew H. Metz
*Attorney, Agent, or Firm*—Bayless E. Rutherford, Jr.

[57] ABSTRACT

A process for preparing a fluid, highly-basic, magnesium-containing dispersion, wherein the process comprises: forming an admixture of oil soluble dispersing agent, magnesium oxide, volatile solvent, water, alcohol, and ammonia or ammonium compound, treating the admixture with carbon dioxide, adding to the carbonated admixture a nonvolatile diluent oil, and removing the volatile materials. The process is particularly suitable for preparing large batches of product and, therefore, is suitable for commercial preparation of the product. The product is useful in lubricating compositions for internal combustion engines. Important features of the process are: use of a very small amount of alcohol, use of ammonia or ammonium compound and use of certain types of magnesium oxide.

19 Claims, No Drawings

PROCESS FOR PREPARING HIGHLY-BASIC, MAGNESIUM-CONTAINING DISPERSION

CROSS-REFERENCE TO RELATED APPLICATIONS

The present application is a continuation-in-part of application Ser. No. 245,635, filed Apr. 19, 1972, and now abandoned.

BACKGROUND

Highly-basic, magnesium-containing dispersions are useful materials of commerce. For example, they can be used in lubricants for both internal combustion and diesel engines. In addition, they can be used as a corrosion inhibitor in fuel compositions containing vanadium.

The term "highly-basic" refers to materials containing an amount of magnesium in excess of that required to form a neutral salt of the dispersing agent. Other terms which have been used to describe these types of materials include overbased and hyperbasic.

Many processes are known for preparing highlybasic, magnesium-containing dispersions. While several of these processes are suitable for preparing large batches (i.e., commercial size) of products, it is difficult to find a process which is suitable for preparing large batches of product which is economical.

For example, the process of U.S. Pat. No. 3,150,089 is an excellent process which produces a fine product. The process uses an alkoxy ethanol solution of a magnesium alkoxy ethoxide-carbonate complex. Because of the amount of alkoxy ethanol used and the use of magnesium metal the process is not as economical as the process of the present invention.

Accordingly, it is apparent that it would be desirable to have a low-cost process for preparing large batches of fluid, highly-basic, magnesium-containing dispersions. The present invention concerns such a process.

PRIOR ART

As stated in the "Background" discussion, many processes are known for preparing highly-basic, magnesium-containing dispersions. Also, many processes are known for preparing highly-basic dispersions of other alkaline earth metals, particularly calcium and barium. A search of the prior art produced the following U.S. Pat. Nos. which are concerned with the general area of preparing highly-basic dispersions of alkaline earth metals: 3,126,340; 3,256,186; 3,260,670; 3,320,162; 3,492,230; 3,524,814; 3,535,242; 3,544,463; 2,856,359; 2,856,360; 2,856,361; 3,429,811; 2,865,956; 3,235,494; 3,365,396; 3,384,585; 3,488,722; 2,779,784; 2,889,279; 2,895,913; 2,924,617, 3,150,089; and 3,250,710.

None of the patents listed in the foregoing specifically teach my process as described herein. With regard to the prior art, as a whole, the following statements can be made:

1. None of the prior art references, with the exception of U.S. Pat. No. 3,629,109, which will be discussed hereinafter, recognize that use of certain types of magnesium oxide give improved results;

2. Many of the prior art references teach the use of an alcohol soluble magnesium alcoholate or magnesium complex to prepare highly-basic, magnesium-containing dispersions; 3. In general, the prior art references teach the use of large amounts of alcohol, which amounts are several times that used in my process;

4. Many of the processes of the prior art references are suitable for preparing both magnesium- and calcium-containing dispersions. In fact, many of the references teach that the process thereof is suitable for preparing dispersions of alkaline earth metals.

It should be stated at this time that my process differs from the foregoing teachings of the prior art in the following ways:

1. my process uses magnesium oxide and not an alcoholic solution of a magnesium alcoholate,
2. my process uses a specific type of magnesium oxide,
3. my process uses a much lower amount of alcohol than do most of the processes of the prior art, and
4. my process is not suitable for preparing highly-basic calcium-containing dispersions using calcium oxide.

In view of the foregoing distinctions between the process of my invention and the general teachings of the prior art and due to the number of patents listed in the foregoing, only the following patents will be discussed in detail.

U.S. Pat. No. 3,524,814 teaches a method of preparing overbased alkaline earth metal sulfonates. Calcium and magnesium are specifically taught in the examples. The process uses a lower alkanol and blowing with $CO_2$. The salient feature of the process is the use of catalytic amounts of ammonia, sufficient to form from about 0.01 to about 0.2 mole of carbamate in the mixture. In Column 3, lines 40 and 41, the patent teaches the use of from about 5 to about 20 moles of alkanol. The basis is not specified at this point. However, since Example I uses 20 moles of methanol per mole of sulfonic acid (dispersing agent), presumably the amount of alkanol is based on the dispersing agent.

The teachings of this patent are not pertinent to my process for the following reasons: (1) it teaches that both magnesium and calcium are operable, whereas calcium is not operable in my process, and (2) it teaches that amounts of alcohol up to 20 moles per mole of dispersing agent can be used whereas an amount of alcohol of 10 moles per mole of dispersing agent is not operable in my process.

U.S. Pat. No. 3,282,835 teaches a process for preparing carbonated bright stock sulfonates wherein the process comprises carbonating a substantially anhydrous mixture of the bright stock sulfonic acid with at least three equivalents of an alkaline earth metal base per equivalent of acid in the presence of a "promoting agent" and heating to remove the promoting agent. The patent teaches that it is especially desirable (Column 4, line 4) to use an inorganic halide (e.g., sodium chloride) in combination with the promoting agent. Suitable promoting agents are hydroxy compounds such as an alcohol (e.g., methanol) or a phenol. The amount of promoting agent is from 0.1 to 10 equivalent per equivalent of bright stock sulfonic acid. The teachings of this process are not pertinent to my process, particularly since it teaches the process is operable for calcium-containing dispersions, whereas my process is not operable for calcium-containing dispersions.

U.S. Pat. No. 3,488,720 teaches a process for preparing overbased calcium dispersions wherein the amount of water is critical. This patent is not pertinent to my process since calcium is inoperable in my process.

Moreover, an admixture of lime, methanol and hydrocarbonaceous diluent is carbonated prior to adding the dispersing agent.

The following references were cited against the parent application: U.S. Pat. Nos. 3,609,076; 3,629,109; 3,524,814; 3,126,340; and 2,839,470.

U.S. Pat. No. 3,524,814 has been discussed in the foregoing. U.S. Pat. No. 3,126,340 is not pertinent since it contains teachings similar to that of U.S. Pat. No. 3,524,814.

U.S. Pat. No. 2,839,470 was cited only to show that it was old to use mixtures of sulfonic acids and carboxylic acids as dispersing agents. From the discussion of applicant's invention, it is believed apparent that the type of dispersing agent is not important.

U.S. Pat. No. 3,609,076 teaches the preparation of highly basic alkaline earth metal sulfonates by a process which comprises treating a neutral alkaline earth metal sulfonate with a mixture comprising an excess amount of basic alkaline earth compound (e.g., calcium oxide or magnesium oxide), a lower alkanol, water and a catalytic amount of an ammonium salt of a lower aliphatic acid (e.g., ammonium acetate). The resulting admixture is then blown with gaseous $CO_2$. In Column 2, line 31, the patent teaches that the amount of lower alkanol used is about 5 to about 20 moles per mole of basic alkaline earth compound. The patent further teaches that either an aliphatic or aromatic hydrocarbon solvent can be used (Column 2, lines 16–18). The teachings of the patent are not pertinent for the following reasons:

1. The patent teaches the preparation of both calcium and magnesium dispersions (my process is not suitable for preparing calcium dispersions).
2. The patent teaches that aromatic solvents can be used (aromatic solvents cannot be used in my process).
3. The patent teaches an amount of alcohol which is considerably in excess of that used in my process.

U.S. Pat. No. 3,629,109 teaches a process for preparing basic magnesium salts of oil soluble organic acids (e.g., sulfonic or carboxylic acids), wherein the process uses magnesium oxide. The patent teaches that certain types of "light" magnesium oxides give better results.

The teachings of U.S. Pat. No. 3,629,109 are not pertinent for the following reasons:

1. From the description provided herein it is apparent that all of the so-called light magnesium oxides do not give comparable results.
2. The patent teaches that in order to prepare magnesium-containing dispersions having a metal ratio in excess of about 5 or 6, the process must use a two-step carbonation. This feature is contrary to my process.
3. The patent teaches no initial maximum or minimum amount of alcohol. By contrast, the amount of alcohol is important in my process.

BRIEF SUMMARY OF THE INVENTION

Broadly stated, the present invention is directed to a process for preparing a fluid, highly-basic, magnesium-containing dispersion, wherein the process comprises:

a. forming an admixture of:
 i. oil soluble dispersing agent,
 ii. magnesium oxide,
 iii. volatile aliphatic hydrocarbon solvent,
 iv. alcohol,
 v. water,
 vi. ammonia or ammonium compound,
b. treating the admixture of step (a) with at least one mole of carbon dioxide per mole of overbasing magnesium present,
c. adding a nonvolatile diluent oil to the carbonated admixture, and
d. removing the volatile materials.

While the overall process is quite specific, as will be apparent from the detailed description, the important features of the process are:

a. use of certain types of magnesium oxide,
b. use of a small amount of alcohol,
c. use of controlled amount of water,
d. use of certain types of dispersing agents, and
e. use of certain types of volatile solvent.

DETAILED DESCRIPTION

Materials Used

The type of magnesium oxide used in my process is a matter of importance since certain types are more reactive than others. Usually, commercial grades of magnesium oxide (magnesia) are prepared by calcining magnesium carbonate, magnesium hydroxide or mixtures thereof. Magnesium oxide prepared by calcining at lower temperatures (e.g., below about 1000°C.) are more suitable in that they have lower bulk densities and less periclase material. The following illustrates the relationship of kiln temperature and bulk density.

| Kiln Temperature | Bulk Density |
| --- | --- |
| 1300°C. | 90 lbs./cu.ft. |
| 900°C. | 10 lbs./cu.ft. |

The following table shows the physical properties on three satisfactory and one unsatisfactory sample of comercially available magnesium oxide. The B.S.&W. on the products prepared using these particular magnesium oxides is also shown. The B.S.&W. test is a measure of the sediment or unreacted material in the product. While the lower B.S.&W. materials are preferred, materials having a B.S.&W. up to 10 percent can be used commercially since the B.S.&W. can be improved by centrifugation and filtration.

| Sample | Satisfactory | | | Not Satisfactory |
| --- | --- | --- | --- | --- |
| | A | B | C | D |
| Bulk Density, lbs./cu.ft. | 5 | 15 | 7–14 | 21 |
| Iodine No. | 45 | 35 | 31 | 135 |
| Surface Area, M²/g. | 50 | 43 | — | 185 |
| X-ray Crystal Size | 190A | 240A | 155A | 100A |

Continued

| Sample | Satisfactory | | | Not Satisfactory |
|---|---|---|---|---|
| | A | B | C | D |
| Pore volume/cc/g. | | | | |
| 100–500A | 0.50 | 0.22 | 0.21 | 0.54 |
| 1000–10,000A | 0.89 | 0.49 | 1.66 | 0.09 |
| Total | 1.39 | 0.71 | 1.87 | 0.63 |
| Product B.S.&W. | 0.5 | 7.0 | 2.5 | 16.0 |

From the foregoing the suitable and preferred properties for the magnesium oxide to be used in my process can be stated as follows in decreasing importance:

| Property | Suitable | Preferred |
|---|---|---|
| Bulk Density, less than, lbs./cu.ft. | 20 | 16 |
| Pore Volume, cc/g., above | 0.64 | 0.75 |
| Iodine No., below | 135 | 100 |

Suitably, the X-ray crystal size should be above 105A and preferably above 115A. As is implied, the X-ray crystal size is the least important of the physical properties of the magnesium oxide.

Suitable oil soluble dispersing agents include the oil soluble sulfonic acids, mixtures of oil soluble sulfonic acids and oil soluble aliphatic hydrocarbon monocarboxylic acids, and the metal salts thereof. Preferably, the metal salt is magnesium. The term "oil-soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil-soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonic acids can be derived from either alkyl or alkaryl hydrocarbons. In addition, they can be derived from hydrocarbons having cycloaklyl (i.e., naphthenic) groups in the side chains attached to the benzene ring. The alkyl groups in the alkaryl hydrocarbons can be straight or branched chain. The aryl moiety can be phenyl, tolyl, xylyl, ethylphenyl, or naphthyl.

An example of a hydrocarbon feedstock which has been particularly useful in preparing synthetic sulfonic acids is a material known as postdodecylbenzene. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | | |
|---|---|---|
| Specific gravity at 38°C. | | 0.8649 |
| Average molecular weight | | 385 |
| Percent sulfonatable | | 88 |
| A.S.T.M. D-158 Engler: | | |
| I.B.P., | °F. | 647 |
| 5 | °F. | 682 |
| 50 | °F. | 715 |
| 90 | °F. | 760 |
| 95 | °F. | 775 |
| F.B.P. | °F. | 779 |
| Refractive index at 23°C. | | 1.4900 |
| Viscosity at: | | |
| −10°C, centistokes | | 2800 |
| 20°C, centistokes | | 280 |
| 40°C, centistokes | | 78 |
| 80°C, centistokes | | 18 |
| Aniline point, °C. | | 69 |
| Pour Point, °F. | | −25 |

An example of another hydrocarbon feedstock which is particularly useful in preparing synthetic sulfonic acids is a material referred to as "dimer alkylate." Dimer alkylate has a long, branched-chain alkyl group. Briefly described, dimer alkylate is prepared by the following steps:

1. dimerization of a suitable feedstock, such as cat poly gasoline,
2. alkylation of an aromatic hydrocarbon with the dimer formed in step (1). Preferably, the dimerization step uses a Friedel-Crafts alkylation sludge as the catalyst. This process and the resulting product are described in U.S. Pat. No. 3,410,925.

An example of still another hydrocarbon feedstock is a material similar to dimer alkylate, but which has one long, substantially straight-chain alkyl group.

An example of another hydrocarbon feedstock which is particularly useful for preparing synthetic sulfonic acids which can be used in my invention is a material which I refer to as "NAB Bottoms." NAB Bottoms are predominantly di-n-alkyl aromatic hydrocarbon wherein the alkyl groups contain from 8 to 18 carbon atoms. They are distinguished primarily from the preceding sulfonation feedstocks in that they are straight-chain and contain a large amount of disubstituted material. A process of preparing these materials and the resulting product are described in Canadian Pat. No. 954,571. The product is also described in U.S. Pat. No. 3,288,716, which is concerned with an additional use for the product, other than sulfonation feedstock.

In order to make my disclosure even more complete, U.S. Pat. No. 3,410,925 and Canadian Pat. No. 954,571 are made a part of this disclosure.

The oil-soluble sulfonic acids are preferred for use in my process.

In addition to the sulfonic acids derived from the foregoing-described hydrocarbon feedstock, examples of other suitable sulfonic acids include the following: mono- and poly-wax-substituted naphthalene sulfonic acid, dinonyl naphthalene sulfonic acid, diphenyl ether sulphonic acid, naphthalene disulphide sulfonic acid, dicetyl thianthrene sulfonic acid, dilauryl beta-naphthol sulfonic acid, dicapryl nitronaphthalene sulfonic acid, unsaturated paraffin wax sulfonic acid, hydroxy substituted paraffin wax sulfonic acid, tetraamylene sulfonic acid, mono- and poly-chlorosubstituted paraffin wax sulfonic acid, nitrosoparaffin wax sulfonic acid; cycloaliphatic sulfonic acid such as laurylcyclohexyl sulfonic acid, mono- and poly-wax-substituted cyclohexyl sulfonic acid, and the like.

Suitable carboxylic acids which can be used include naphthenic acids, such as the substituted cyclopentane monocarboxylic acids, the substituted cyclohexane monocarboxylic acids and the substituted aliphatic polycyclic monocarboxylic acids containing at least 15 carbon atoms. Specific examples include cetyl cyclohexane carboxylic acids, dioctyl cyclopentane carboxylic acids, dilauryl decahydronaphthalene and stearyl-octahydro indene carboxylic acids and the like and oil-soluble salts thereof. Suitable oil-soluble fatty acids are those containing at least 8 carbon atoms. For producing the object of this invention in liquid form, I prefer fatty acids which are liquids at ambient temperatures down to about 15°C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable. Examples of commercially available tall oil fatty acids include the "Crofatols," available from Crosby Chemical Company and the "Acintols," available from Arizona Chemical Company.

It may be well to mention here that usually commercial sulfonic acids and sulfonates are not 100 percent acid or sulfonate. Instead, they are a mixture of sulfonic acid, or sulfonates with a nonvolatile diluent oil. For example the term "40 percent active sulfonic acid" refers to a composition containing 40 percent sulfonic acid.

A wide variety of nonvolatile diluent oils are suitable in the process of my invention. The principal requisites desired in the nonvolatile diluent are that it will act as a solvent for the dispersing agent which is used and has a boiling point of 160°C. and above. Suitable nonvolatile diluent oils include materials boiling in the lubricating oil range. Examples of nonvolatile diluents boiling in the lubricating oil range which can be used include mineral lubricating oils obtained by any of the conventional refining procedures; synthetic lubrication oils, such as polymers of propylene, polyoxyalkylenes, polyoxypropylene, dicarboxylic acid esters, and esters of phosphorus; synthetic hydrocarbon lubricating oils, such as dialkylbenzenes, diphenylalkanes, alkylated tetrahydronaphthalenes, and mixtures of these materials; vegetable oils, such as corn oil, cotton seed oil, and castor oil; and animal oils, such as lard oil and sperm oil. Of the nonvolatile diluents described hereinbefore, the mineral lubricating oils and the synthetic lubricating oils are considered more suitable, with the mineral lubricating oils being preferred.

Suitable volatile solvents for use in my process include only aliphatic hydrocarbon solvents having a boiling point below about 150°C. Examples of suitable aliphatic hydrocarbon solvents include heptane, hexane and petroleum naphtha. In connection with the suitable volatile solvents, it should be noted that the aromatic solvents (e.g., benzene) do not appear to work in my process.

Suitable alcohols for use in my process include $C_1-C_6$ aliphatic alcohols and alkoxy ethanols containing 3 to 7 carbon atoms. Examples of suitable alcohols include methanol, ethanol, isopropanol, butanol, pentanol, hexanol, methoxy ethanol, ethoxy ethanol and butoxy ethanol. The more suitable alcohols include methanol and methoxy ethanol. Of these, methanol is preferred for reasons of economy.

A small amount of ammonia or ammonium compound (which is ammonium hydroxide or an ammonium salt) is used in my process. Examples of suitable ammonium salts include ammonium carbonate, ammonium chloride, ammonium sulfate, ammonium sulfonate and ammonium carboxylate.

In some instances it is desirable to use a small amount of a low molecular weight sulfonic acid in the process of my invention. By "low molecular weight" is meant a sulfonic acid wherein the hydrocarbon portion has a molecular weight less than about 270. When used these are usually present in an amount in the range of about 1 to about 20 parts based on the dispersing agent (100 parts).

Amounts of Materials Used

The relative amounts of materials used, both suitable and preferred ranges, are shown below in tabular form.

| Material | Parts by Weight | |
|---|---|---|
| | Suitable | Preferred |
| Dispersing Agent | 75–125 | 90–110 |
| Nonvolatile Diluent Oil[1] | 100–300 | 150–225 |
| Volatile Solvent | 100–500 | 200–400 |
| Alcohol[2] | 2–30 | 5–20 |
| Water | 30–50 | 35–45 |
| Magnesium Oxide | 20–90 | 30–70 |
| $NH_3$ or Ammonium Compound (as $NH_3$) | 0.6–9 | 1.5–6 |

[1] This includes the nonvolatile diluent oil inherently present in the sulfonic acid or carboxylic acid; it thus includes the unsulfonated hydrocarbons when the dispersing agent is a sulfonic acid.
[2] Expressed on a molar basis, as compared to the dispersing agent, the alcohol can be expressed as being in the range of about 0.1 to about 4 moles, preferably from about 0.25 to about 1.5 moles, per mole of dispersing agent.

PROCESS CONDITIONS

In conducting the process of my invention, an admixture is formed of the oil soluble dispersing agent, volatile hydrocarbon solvent, alcohol, water, magnesium oxide and ammonia or ammonium compound. While the entire amount of nonvolatile diluent oil can be added to the initial admixture, preferably this is not done. Preferably, the only nonvolatile diluent oil present in the initial admixture is that which is concurrently present in the dispersing agent. When the dispersing agent is a sulfonic acid or metal sulfonate, the amount of nonvolatile oil is usually at least 25 parts, more usually at least 50 parts, by weight, based on the amount of dispersing agent shown in the table in the foregoing.

The admixture is then carbonated, preferably by blowing with $CO_2$ gas. During the carbonation step it is desirable that the temperature of the admixture be maintained in the range of about 25° to about 50°C. The amount of carbon dioxide employed is somewhat important, since the theoretical amount does not react. When using very long carbonation times (i.e., 2–10 hours), the minimum amount is the stoichiometric requirement (i.e., 1 mole $CO_2$ per mole of overbasing magnesium). When using shorter carbonation times (i.e., less than 2–10 hours), it is desirable to use 1.25 times, preferably 1.5 times, the stoichiometric requirement.

Following the carbonation step it may be desirable to heat the admixture (preferably at reflux temperature) for a short period of time (e.g., one-fourth to 2 hours). The required amount of the nonvolatile diluent oil is then added. The volatile materials in the admixture are then removed, preferably by heating, usually to a temperature of about 150°C.

Following this removal of the volatile materials, the product is usually blown with $CO_2$ gas for a short time (e.g., 15 to 30 minutes) while maintaining the temperature at 150°–160°C. The purpose of this final step, comprising blowing with $CO_2$ gas, is to remove traces of volatile materials, which may be necessary. It should be emphasized that this final $CO_2$ blowing step is not necessary; it is only something which may be desirable.

The product may then be filtered or centrifuged to remove suspended solid materials. Whether or not this filtration or centrifugation step is required is dependent on a number of factors, such as product specification, materials used during process, and deviation from optimum conditions in practicing the process. A typical test for measuring suspended solid materials is the B.S.&W. test. This test measures the precipitate obtained by diluting 100 grams of the product to 200 ml. total volume with n-hexane and centrifuging for 20 minutes at 1500 RPM. The result is reported as ml.ppt./100 g. product.

PRODUCT OF MY INVENTION

The products of my invention contain unusually large amounts of dispersed basic magnesium compounds while still being fluid. The basic magnesium compounds are a mixture of magnesium carbonate and magnesium hydroxide. At least 50 percent, usually at least 70 percent, of the basic magnesium compounds is magnesium carbonate.

Two methods of expressing the amount of dispersed basic metal compounds are commonly used. One is the "base number," which is a measure of the mg KOH per gram of sample. I prefer the "acetic base number" method, which is described in numerous United States and foreign patents (e.g., U.S. Pat. No. 2,861,951 and U.S. Pat. No. 3,150,089).

A second method is the "metal ratio" which, as used herein, is defined as the ratio of the total amount of magnesium in the composition to the amount of magnesium theoretically combinable as a normal salt with the dispersing agent used.

The product of my invention can have a base number of 500 (or metal ratio of 15) while still being fluid. By fluid, I mean the product has a viscosity below 2000 centistokes at 100°F.

In order to disclose the nature of the present invention still more clearly, the following examples, both illustrative and comparative, will be given. It is to be understood, however, that the invention is not to be limited to the specific conditions or details set forth in these examples except insofar as such limitations are specified in the appended claims.

EXAMPLE 1

The following example illustrates the process of my invention using preferred conditions in preparing a 1-liter preparation.

Materials Used

| | | |
|---|---|---|
| Sulfonic Acid[1] | 225 | g. |
| Hexane | 100 | ml. (66 g.) |
| Methanol | 5 | ml. (4 g.) |
| Magnesium Oxide[2] | 26.4 | g. |
| Nonvolatile Diluent Oil[3] | 48.2 | g. |
| Water | 20 | g. |
| Ammonium Hydroxide[4] | 5 | g. |

-Continued

Materials Used

[1] This sulfonic acid was a hexane solution of a sulfonic acid prepared from a 70/30 blend of the following sulfonation feedstocks, respectively: A monoalkylbenzene prepared from dimerized dodecene and a stripped "NAB" Bottoms consisting predominantly of dialkylbenzenes. The sulfonic acid solution had the following analysis:

| | |
|---|---|
| Sulfonic Acid (Combining Weight = 440) | 26.3 wt.% |
| Unsulfonated Feedstock and Nonvolatile Diluent Oil | 21.1 wt.% |
| Hexane | 52.6 wt.% |

[2] The magnesium oxide was the same as that referred to as Sample A on page 10 in Detailed Description.

[3] This material was a naphthenic lubricating oil having a viscosity of about 500 SSU at 100°F.

[4] The ammonium hydroxide solution contained 30 percent ammonia; therefore, the amount of ammonia employed was 1.5 g.

Procedure

To a 1-liter reaction flask were added the hexane solution of sulfonic acid, water, methanol, magnesium oxide, and ammonium hydroxide. The admixture was cooled to 25°C. and blown with $CO_2$ gas for 60 minutes at a rate of 316 ml/minute (1.5 times the theoretical amount of $CO_2$ needed to form magnesium carbonate). The carbonated admixture was then heated to reflux temperature for 30 minutes, the nonvolatile diluent oil then added and the volatile materials were removed by heating to 150°C. The product was blown with $CO_2$ gas for 15 minutes while maintained at a temperature of 150°–160°C. The product was bright and fluid and had the following anaylsis:

| | |
|---|---|
| Acetic Base Number | 320 |
| B.S.&W. | 0.6% |

EXAMPLE 2

This example illustrates the effect of using a small amount of ammonia in my process. It also illustrates the effect of using no ammonia in my process. The procedure of Example 1 was used with the exception that the amount of ammonium hydroxide added varied. The results of the runs are shown as follows:

| Run No. | Ammonium Hydroxide Added[1] | B.S.&W. | Base No. |
|---|---|---|---|
| A[2] | 5 ml. | 0.6% | 320 |
| B | 1.5 ml. | 0.9% | 305 |
| C | 1 ml. | 1.6% | 300 |
| D | 0 | 22.0% | 274 |

[1] Containing 30 percent ammonia.
[2] Example 1 for purposes of comparison.

EXAMPLE 3

This example illustrates the effect of using no alcohol and of using methoxy ethanol as the alcohol. The materials used and the procedure were the same as in Example 1 with the exception of the amount and type of alcohol. The results are summarized below.

| Run No. | Alcohol Type | Alcohol Amount | B.S.&W. | Base No. |
| --- | --- | --- | --- | --- |
| A | Methoxy Ethanol | 10 ml. | 2.0% | 281 |
| B | Methoxy Ethanol | 5 ml. | 1.6% | 280 |
| C | None | None | 8.0% | 280 |
| D | Methanol | 5 ml. | 3.0% | 285 |

EXAMPLE 4

This example illustrates the effect of using a less reactive magnesium oxide than used in Example 1 and the effect of ammonia on the process using this less reactive magnesium oxide. The magnesium oxide used in this example was the same as Sample B as described on page 10 in the Detailed Description. With the exception of the amount of ammonium hydroxide solution, the amounts of materials and the procedure were the same as in Example 1. The results are summarized below:

| Run No. | Ammonium Hydroxide Solution | B.S.&W. | Base No. |
| --- | --- | --- | --- |
| A | 10 ml. | 6.5% | 303 |
| B | 0 | 11.0% | 260 |

In Run A during carbonation the temperature increased from 25°C. to 57.5°C., while in Run B the temperature increased from 25°C. to 33°C. In Run B the product was decidedly more viscous and in the sample used for the B.S.&W. test, even after centrifuging the hexane phase was still very hazy. By contrast, in Run A the hexane phase after centrifuging was very bright.

EXAMPLE 5

This example presents a series of runs showing the effect of using larger amounts of alcohol in my process.

| Run No. | Alcohol Type | Alcohol Amount | Maximum Temperature During Carbonation | B.S.&W. |
| --- | --- | --- | --- | --- |
| A[1] | Methanol | 5 ml. | 57°C. | 0.6% |
| B | Methanol | 50 ml. | 33°C. | 28.0% |
| C | Methanol | 25 ml. | 45°C. | 7.0% |
| D | Methanol | 15 ml. | 51°C. | 1.5% |
| E | Methoxy Ethanol | 25 ml. | 53°C. | 4.4% |

[1]Example 1 for purposes of comparison.

EXAMPLE 6

This example is comparative and shows that calcium oxide does not work in the process of my invention. The amounts of materials used and procedure were the same as in Run D of Example 5 with the exception that calcium oxide was used, using the same molar amount as used in Run D. The temperature rose to 55°C. during carbonation. The amount of nonvolatile diluent oil was reduced to 39.7 g. in order to give the same weight of product with the same base number as Run D of Example 5. The process resulted in a viscous, cloudy grease.

EXAMPLE 7

Examples have been run using the procedure of Example 1 with the exception that benzene and toluene have been substituted for the hexane. A satisfactory product did not result.

EXAMPLE 8

This example shows the preparation of a 100-gallon batch of product using the preferred conditions of my process which had an acetic base number, above 400, which is very high.

Materials Used:

| | | |
| --- | --- | --- |
| Sulfonic Acid A[1] | 275 | lbs. |
| Sulfonic Acid B[2] | 93 | lbs. |
| Methoxy Ethanol | 15.2 | lbs. |
| Magnesium Oxide[3] | 61.1 | lbs. |
| Ammonium Hydroxide[4] | 13.7 | lbs. |
| Water | 30.5 | lbs. |
| Nonvolatile Diluent Oil[5] | 90 | lbs. |

[1] This sulfonic acid was a hexane solution of a sulfonic acid prepared from a mixture of dialkylbenzenes, monostraight-chain alkylbenzenes, and monoalkylbenzenes derived from dimerized dodecene. The acid had the following analysis:

| | |
| --- | --- |
| Sulfonic Acid (Combining Weight = 480) | 24.4% |
| Unsulfonated Feedstock and Nonvolatile Diluent Oil | 11.1% |
| Hexane | 66.5% |

[2] This sulfonic acid was a hexane solution of a sulfonic acid prepared by the sulfonation of a "dimerized dodecene" alkylbenzene. The acid had the following analysis:

| | |
| --- | --- |
| Sulfonic Acid (Combining Weight = 403) | 20.9% |
| Unsulfonated Feedstock and Nonvolatile Diluent Oil | 12.3% |

[3] This magnesium oxide had the properties of Sample B as described on page 7 of the Detailed Description.

[4] The ammonium hydroxide contained 30 percent ammonia.

[5] A naphthenic lubricating oil having a viscosity of 500 SSU at 100°F.

Process

An admixture was formed of sulfonic acid solution A, sulfonic acid solution B, 6.1 pounds methoxy ethanol and 6.1 pounds magnesium oxide.

After stirring this admixture for 10 minutes, the following were added thereto: 55 pounds magnesium oxide, 13.7 pounds ammonium hydroxide and 9.1 pounds methoxy ethanol. The temperature of the admixture was adjusted to 75°F. (24°C.). The admixture was then concurrently treated with water and $CO_2$ for 26 minutes. The amount of water added during this time was 30.5 pounds. After completion of the addition of water, the admixture was further blown with $CO_2$ for an additional 81 minutes. The total amount of $CO_2$ added over the 117-minute period was 67.5 pounds. During the $CO_2$ blowing the temperature rose to 114°F. (46°C.). Following carbonation, the reaction mass was heated to 150°F. whereupon 90 pounds of the naphthenic lubricating oil was added. The product was then cooled to 110°F. (43°C.) and centrifuged using Sharples Super D centrifuge.

The centrifuged product was then added again to the Pfaudler reaction vessel where it was blown with $CO_2$ gas, while maintaining mechanical agitation, with the temperature in the range of 238° to 304°F. (114°C. to 150°C.). The reaction mass was then placed under vacuum and blown with nitrogen gas for 3¼ hours while the temperature was between 304° to 312°F. (150°C. to 155°C.)

A sample of the product was slurried with 3 weight percent diatomaceous earth filter aid and filtered through a Büchner funnel. The product had the following analysis:

| | |
|---|---|
| Percent Active | 30.3 |
| Acetic Base Number | 442 |
| B.S.&W., Percent | 0.04 |

EXAMPLE 9

A series of runs were made similar to those of Example 5 except that an attempt was made to maintain constant the maximum temperature during carbonation. The procedure used was that of Example 1 except that the maximum temperature during carbonation was nearly constant. In some cases, application of external heat was needed to bring the temperature up to that of other runs. With the exception of the methanol, the amounts of materials were as follows:

| | |
|---|---|
| Sulfonic Acid | 225 g. |
| Hexane | 100 ml |
| Magnesium Oxide | 26.4 g. |
| Nonvolatile Diluent Oil | 48.2 g. |
| Water | 20 g. |
| Ammonium Hydroxide | 5 g. |

The sulfonic acid, hexane, and ammonium hydroxide were the same as in Example 1. The nonvolatile diluent oil was similar except it had a viscosity of 300 SSU at 100°F. The magnesium oxide was substantially the same as the one used in Example 1. It had the following properties:

| | |
|---|---|
| Bulk Density[1] | 4 |
| Iodine No.[2] | 38 |
| Surface Area, $M^2/g$ [2] | 57.7 |
| Pore Volume/cc/g [2] | |
| 100–500 A | 0.57 |
| 100–10,000 A | 0.74 |
| Total | 1.31 |
| X-ray Crystal Size [2] | Particle Size |
| Crystal Plane 2-0-0 | 120 |
| Crystal Plane 2-2-0 | 120 |
| Crystal Plane 2-2-2 | 140 |

[1] As reported by Product Specification Sheet.
[2] As determined by various Research and Development personnel.

The amounts of methanol, maximum temperature during carbonation, and product B.S.&W. values for the various runs are shown below:

| Run No. | Amount of Methanol (ml) | Maximum Carbonation Temperature °C | Product B.S.&W., % |
|---|---|---|---|
| A | 5 | 52 | 1.8 |
| B | 15 | 52 | 11 |
| C | 50 | 50 | 34 |
| D | 5 | 53 | 2.4 |

Having thus described the invention by providing specific examples thereof, it is to be understood that no undue limitations or restrictions are to be drawn by reason thereof and that many variations and modifications are within the scope of the invention.

The invention having thus been described, what is claimed and desired to be secured by Letters Patent is:

1. A process for preparing a fluid, highly-basic, magnesium-containing dispersion wherein the process comprises:
   a. forming an admixture of:
      i. about 75 to about 125 parts of oil soluble dispersing agent selected from the group consisting of oil soluble sulfonic acids, mixtures of oil soluble sulfonic acids and aliphatic hydrocarbon monocarboxylic acids and the metal salts thereof,
      ii. about 20 to about 90 parts magnesium oxide,
      iii. about 100 to about 500 parts volatile aliphatic hydrocarbon solvent having a boiling point below about 150°C,
      iv. about 2 to about 30 parts of an alcohol selected from the group consisting of $C_1$ to $C_6$ aliphatic alcohols and alkoxy ethanols containing 3 to 7 carbon atoms,
      v. about 30 to about 50 parts water, and
      vi. ammonia or an ammonium compound in an amount sufficient to provide about 0.6 to about 9 parts ammonia,
   b. treating the admixture of step (a) with at least one mole of carbon dioxide per mole of overbasing magnesium present,
   c. adding to the carbonated admixture about 100 to about 300 parts of a nonvolatile diluent oil having a boiling point above 160°C, and
   d. removing the volatile materials,
   said process being characterized further in that:
   a. the magnesium oxide has the following properties:

| | |
|---|---|
| Bulk Density, less than lbs/cu.ft. | 16 |
| Pore volume, cc/g., above | 0.75 |
| Iodine No., below | 100, and | b. the amount of alcohol in step (a) (iv) is in the range of about 0.1 to about 4.0 moles per mole of dispersing agent.

2. The process of claim 1 wherein the magnesium oxide has an X-ray crystal size above 105 A.

3. The process of claim 2 wherein the nonvolatile diluent oil of step (c) is selected from the group consisting of mineral lubricating oils and synthetic lubricating oils.

4. The process of claim 3 wherein the alcohol of step (a) (iv) is selected from the group consisting of methanol and methoxy ethanol.

5. The process of claim 4 wherein the alcohol is methanol.

6. The process of claim 5 wherein the temperature of carbonation in step (b) is in the range of about 25° to about 50°C.

7. The process of claim 6 wherein the amount of alcohol in step (a) (iv) is in the range of about 0.25 to about 1.5 mole per mole of dispersing agent.

8. The process of claim 7 characterized further in that the product produced thereby has an acetic base number of at least 400 while having a viscosity below 2000 centistokes at 100°F.

9. A process for preparing a fluid, highly-basic, magnesium-containing dispersion wherein the process comprises:
   a. forming an admixture of:
      i. about 90 to about 110 parts of oil soluble dispersing agent selected from the group consisting of oil soluble sulfonic acids, mixtures of oil soluble sulfonic acids and aliphatic hydrocarbon monocarboxylic acids, and the metal salts thereof,
ii. about 30 to about 70 parts magnesium oxide,
iii. about 200 to about 400 parts volatile aliphatic hydrocarbon solvent having a boiling point below about 150°C,
iv. about 5 to about 20 parts of an alcohol selected from the group consisting of $C_1$ to $C_6$ aliphatic alcohols and alkoxy ethanols containing 3 to 7 carbon atoms,
v. about 35 to about 45 parts water, and
vi. an ammonia or ammonia compound in an amount sufficient to provide about 0.6 to about 9 parts ammonia,
b. treating the admixture of step (a) with at least one mole of carbon dioxide per mole of overbasing magnesium present,
c. adding to the carbonated admixture about 150 to about 225 parts of a nonvolatile diluent oil having a boiling point above 160°C, and
d. removing the volatile materials,
said process being characterized further in that:
a. the magnesium oxide has the following properties:

| | |
|---|---|
| Bulk Density, less than lbs/cu.ft. | 16 |
| Pore Volume, cc/g., above | 0.75 |
| X-ray Crystal size, above | 105 A |
| Iodine No., below | 100, and | b. the amount of alcohol in step (a) (iv) is in the range of about 0.1 to about 4.0 moles per mole of dispersing agent.

10. The process of claim 9 wherein the nonvolatile diluent oil is selected from the group consisting of mineral lubricating oils and synthetic lubricating oils.

11. The process of claim 10 wherein the alcohol of step (a) (iv) is selected from the group consisting of methanol and methoxy ethanol.

12. The process of claim 11 wherein the alcohol is methanol.

13. The process of claim 12 wherein the temperature of carbonation in step (b) is in the range of about 25° to about 50°C.

14. The process of claim 13 wherein the amount of alcohol in step (a) (iv) is in the range of about 0.25 to about 1.5 mole per mole of dispersing agent.

15. The process of claim 14 wherein the nonvolatile diluent oil is a mineral lubricating oil.

16. The process of claim 15 characterized further in that the product produced thereby has an acetic base number of at least 400 while having a viscosity below 2000 centistokes at 100°F.

17. A process for preparing a fluid, highly-basic, magnesium-containing dispersion wherein the process comprises:
a. forming an admixture of:
i. about 90 to about 110 parts of an oil-soluble sulfonic acid,
ii. about 30 to about 70 parts magnesium oxide,
iii. about 200 to about 400 parts volatile hydrocarbon solvent having a boiling point below about 160°C,
iv. about 5 to about 20 parts of an alcohol selected from the group consisting of methanol and methoxy ethanol,
v. about 35 to about 45 parts water, and
vi. ammonia or ammonium hydroxide in an amount sufficient to provide about 1.5 to about 6 parts ammonia,
vii. at least about 25 parts nonvolatile diluent oil having a boiling point above 160°C,
b. treating the admixture of step (a) with at least one mole carbon dioxide per mole of overbasing magnesium present while maintaining the admixture at a temperature in the range of about 25° to about 50°C,
c. adding to the carbonated admixture the amount of nonvolatile diluent oil required to bring the total amount to about 150 to about 225 parts, said nonvolatile diluent oil being selected from the group consisting of mineral lubricating oils and synthetic lubricating oils, and
d. removing the volatile materials,
said process being characterized further in that:
a. the magnesium oxide has the following properties:

| | |
|---|---|
| Bulk Density, less than lbs/cu.ft. | 16 |
| Pore Volume, cc/g., above | 0.75 |
| X-ray Crystal size, above | 105 A |
| Iodine No., below | 100, and | b. the amount of alcohol in step (a) (iv) is in the range of about 0.25 to about 1.5 mole per mole of dispersing agent.

18. The process of claim 17 wherein the alcohol of step (a) (iv) is methanol.

19. The process of claim 18 characterized further in that the product produced thereby has an acetic base number of at least 400 while having a viscosity below 2000 centistokes at 100°F.

* * * * *